Nov. 9, 1948.                B. J. FREED                2,453,425
                    HOT FOOD TABLE HEATING APPARATUS
                         Filed Dec. 27, 1944
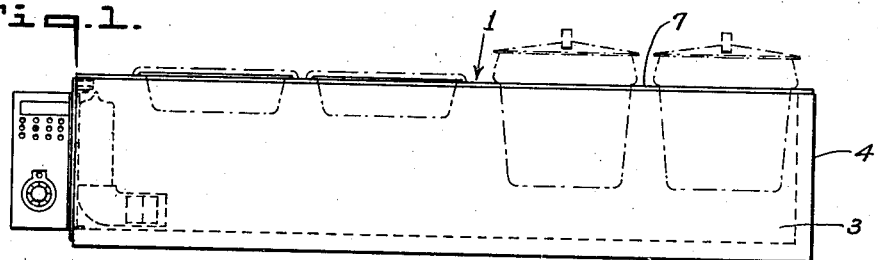
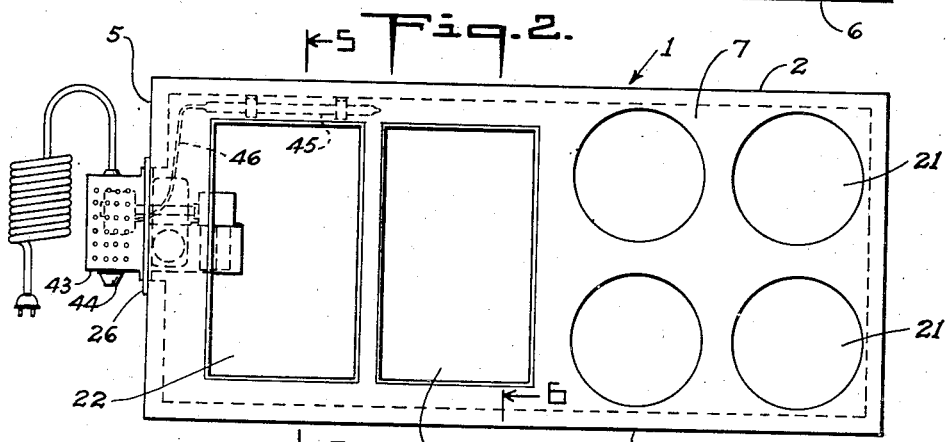
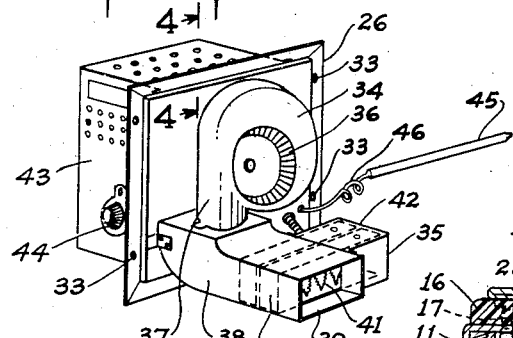
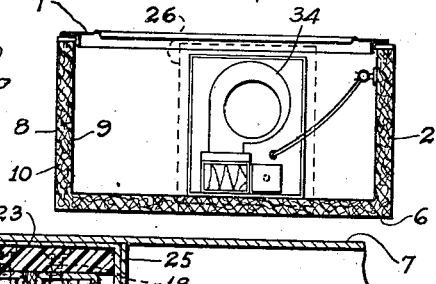
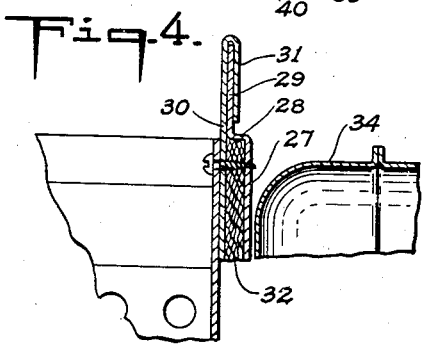
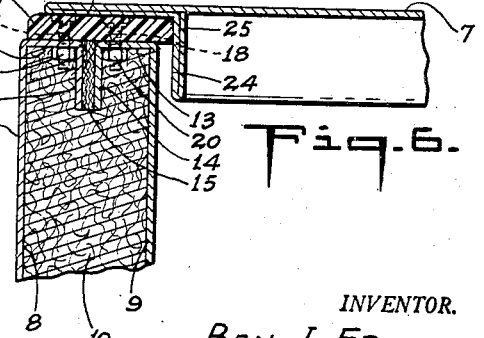
INVENTOR.
BEN J. FREED
BY Carl E. Ring
& Albert M. Parker Patented Nov. 9, 1948

2,453,425

UNITED STATES PATENT OFFICE 2,453,425

HOT FOOD TABLE HEATING APPARATUS

Ben J. Freed, Washington, D. C.

Application December 27, 1944, Serial No. 570,014

3 Claims. (Cl. 219—19)

This invention relates to hot food tables of the steam table type, but wherein the heating is accomplished by heated air, and is particularly concerned with the relationship of the table and the heating means as well as with the heating means itself.

In my application entitled "Hot food table unit," Serial Number 480,020, filed March 22, 1943 and now abandoned, there is disclosed the basic idea of heating and maintaining the temperature of food, carried by hot food tables, by electrically heated recirculated air. In that application, it was pointed out that in the prior heating of food and maintaining the heat in it ready for immediate service, the heating was done either by means of the so-called steam tables or, in some instances, by electric strip heaters. Steam tables require a substantial pan, or the like, of water which is kept warm by some heating means such as a gas burner, an electric heater, or steam from some other source, with consequent plumbing, piping or electrical connections to be provided for and maintained. Not only is that equipment costly and cumbersome, but its presence complicates the necessary frequent cleaning of the tables. Also it is difficult with steam tables or strip heaters to maintain food at the necessary high uniform temperature, while considerable heat is lost every time a food insert is removed to be replaced by another. Finally, steam tables or strip heaters are generally inefficient, slow in heating the food up, and in restoring it to the proper temperature when cooled off. Thus they fall down in the principal respect in which they should give first-class performance; that is, in reliability.

In my previous application, above identified, I disclosed the idea of heating food carried by tables of the steam table type by means of the heating and recirculation of a volume of confined air. The construction of the instant invention employs the principle disclosed in said previous application, but improves upon some of the features of that disclosure by simplifying them, and by making the construction easier to clean and maintain. In addition, the instant construction enhances the recirculation of the air by more positively propagating it in a horizontal direction, and by expelling the heated air at a lower level than the intake of the air to be heated. Thus, in addition to the horizontal recirculation, full advantage is taken of the tendency of heated air to rise.

The heating and circulating element is carried by a removable panel forming part of the wall of the so-called table. In this way the complete heating device can easily be removed from its operative position, should it be desired to repair the device or replace it by a counterpart. The motor for the blower is mounted on the back of the insulated panel outside of the heated chamber so that it is protected from the heat on the other side of the panel. Finally, a thermostatic control is provided inside the heated chamber to control the operation of the heating device.

It is accordingly an object of this invention to simplify the heating of hot food tables by hot air.

It is another object of the invention to increase the efficiency of the hot air heating of hot food tables.

It is a further object of the invention to render the heating units of air-heated hot food tables readily removable and interchangeable.

It is a still further object of the invention to reduce to a minimum the space occupied by the heating units of hot food tables.

Other and further objects of the invention will in part be obvious, and in part be pointed out in the following description of the invention taken in conjunction with the drawing, in which:

Figure 1 is a longitudinal elevation of the hot food table of my invention, showing hot food inserts in dot-dash lines.

Figure 2 is a plan view of the hot food table without the inserts, but with the thermostat bulb and its connections shown in dotted lines.

Figure 3 is a perspective view of the removable wall panel away from the table, showing the heater-blower parts mounted thereon.

Figure 4 is a fragmentary section taken on lines 4—4 of Figure 3, showing the construction of the removable panel, and the mounting of the motor casing thereon.

Figure 5 is a section taken on lines 5—5 of Figure 2, and

Figure 6 is an enlarged fragmentary section taken on lines 6—6 of Figure 2.

As shown in the various views of the drawing, a hot food table of the steam table type generally shown at 1, has a body in the form of an elongated, box-like member, with side walls 2 and 3, ends 4 and 5, a bottom 6, and a top 7. The walls 2, 3, 4, 5, and 6, and the mounting of the top 7 thereon, are of a construction particularly adapted for the purpose intended. The details of this construction are best shown in Figures 5 and 6. The side, bottom, and end walls of the table member are of substantial thickness, being formed from spaced symmetrical sheet metal shells 8 and 9. The space between these wall members is filled with insulating material 10, such as rock wool, glass wool, or other mass type insulating material. The holding of the shells in proper spaced relationship at their free upper ends is accomplished, as shown in Figure 6, by turning the top of wall member 8 inward at 11, and downward at 12, while wall member 9 is similarly turned outward at 13, and downward at 14. The downturned portions 12 and 14 lie alongside of, but spaced from, each other. This spacing prevents the transfer of heat from the inner to the outer wall by conduction. Also it facilitates the final packing in of insulation material 10 before the shells are secured together.

As a final step before the securing, an asbestos strip 15 is inserted between the downturned portions 12 and 14. This strip keeps the parts 12 and 14 separated, yet totally closes the space between them. The actual securing is brought about by the use of a strip 16 of suitable material such as Bakelite or other plastic. This strip has pairs of bores at spaced intervals to receive the bolts 17 and 18 which pass down through them and through registered openings in the portions 11 and 13 of the wall members 8 and 9. There they engage with nuts 19 and 20 which have already been secured in place on the inside of the portions 11 and 13 in registry with the openings therein. This construction secures the proper relationship of the wall members, additionally prevents their coming into contact with each other, and seals up the insulated space against the penetration of moisture into the insulation. The strip 16 also serves another purpose, for, being by nature a poor conductor of heat, it serves as an effective mounting for the top 7 of the table, and as a seal against the escape of heat from the inside of the table.

The table top 7 is formed of a suitable weight and type of metal to properly support filled food inserts. Such inserts may be of desired shape, size and number, and be received in suitable openings such as the circular ones shown at 21, or the rectangular ones shown at 22. In order to rigidly and accurately position the top 7 with respect to the rest of the table, its outer edge is inwardly flanged at 23 so as to be doubled upon itself, is flanged downward at 24, and upward again at 25, to lie alongside of the flange 24, and terminate at the underside of the top 7. In mounting the top on the side walls of the table, its portion 23 lies upon the strip 16, and its flange 24 closely engages against the inner edge of the strip 16, so that the top is not only securely and rigidly mounted, but is also fitted snugly against the strip to form a seal against leakage past the edge.

As best seen from Figures 1 and 5, the inside of the hot food table 1, and particularly the inside bottom surface thereof, is practically unobstructed. This facilitates cleaning and the ready circulation of hot air for heating the inserts and the food therein. The manner and means for heating the air and putting it into circulation is shown applied to the table in Figures 1 and 2, and apart therefrom in Figure 3. From Figure 2, it can be seen that the end wall 5 is interrupted in order to receive the panel member 26. This panel, as seen best in Figure 4, is of two part construction. It has an inner bellied-out shell 27, formed with a flange 28 around it of a size to fit the interruption in the end wall 5. From the flange 28, the shell 27 extends outward in a surrounding shelf 29. An outer shell 30, merely a flat plate, has edges extending beyond the end of the shelf 29 which are turned thereover into the reinforcing flange 31. The space between the bellied-out portion of the inner shell 27 and the outer shell 30 is filled with a heat absorbing or insulating material 32. The panel 26 may be secured to the end wall 5 by any suitable retaining means such as bolts passed through apertures 33 formed in the peripheral portion of the panel and secured in the wall 5. A blower shown generally at 34 and a heater shown generally at 35 are mounted on the inside of the panel 26. The blower 34 is of substantial capacity, considering the volume of air in the body, or chamber, of the table to be acted upon. The inlet opening 36 of the blower is directed horizontally to induce a stream of air flowing in a generally horizontal direction. The air taken in through the opening 36 in the blower is passed downward through a conduit 37 into a chamber 38 at the rear of the heater 35. The conduit of the heater extends some distance forward from the chamber 38, well past the inlet opening 36 in the blower, to terminate at an outlet opening 39. In this forward extent, the heater conduit diminishes in height as shown.

The portion 40 of the conduit of the heater 35 between the chamber 38 and the opening 39 is traversed by bare wire heating coils 41 of high capacity, considering the volume of air flowing thereover. These coils continue into a lateral housing 42 extending sideways from the portion 40. Thus air forced into the chamber 38 by the blower 34 is first compressed by the reduction in height from that chamber forward, and is then allowed to expand out into the housing 42, where it is heated by coils 41, as well as by the portion of those coils in the direct path through section 40. This results in the air forced out from the opening 39 being highly heated as well as being projected at a substantial velocity. Furthermore it is to be particularly noted that the outlet opening 39 is some distance below and well in advance of the inlet 36. This enables the heated air issuing from the opening 39 to escape the intake action of the blower until that air has given up a good portion of the heat to the food inserts extending down from the top 7.

The motor for the blower 34 is mounted on the outside of the panel 26, and is thus insulated from the interior of the table and the heat thereof by the insulating packing 32. A removable perforated guard 43 is mounted over the motor and a hand control for the motor is mounted on the outside of the guard 43 at 44.

I provide an automatic cut-off for the heater to prevent the temperature in the table chamber of housing from rising above a pre-determined maximum. This, as shown, is a thermally responsive bulb 45 which is mounted in clips on the inside of the wall 2 near the top thereof and adjacent the end wall 5. By means of the electrical conduit 46 and suitable electrical devices, the element 45 can cut off the supply of power to the heater when the temperature within the table housing reaches the predetermined maximum. This not only protects the food against being overheated but also protects the coils 41 from burning out should the air supply fail to take the heat away fast enough to prevent this.

From the structure just described, it is believed that the operation of this device will, to a large extent, be obvious. What may not be obvious, however, is the facility and economy with which the device of the invention achieves the desired end. Assuming the food inserts to be in place in the openings 21 and 22 when the heater and blower are started up, then the volume of air within the table housing is confined and remains constant. The blower thus commences a recirculation of air over the heating coils 41 in a substantially horizontal direction, due allowance being given, of course, to the fact that hot air rises. This rising action, however, does not materially interfere with the blast of heated air reaching the end of the housing, at which point in time it is ready to rise and be drawn back over the food inserts for recirculation and reheating.

It has been my experience in working with hot food tables in the past that the manner of heating of this invention is three times as effective as any of those previously employed, by which I mean it will produce the necessary heating in one-third of the time required by the previous devices and, of course, restore lost heat in one-third of the time. Furthermore, this improved operation is brought about with an expenditure of only one-half of the energy required by prior devices. In addition, the instant construction is easy to service and easy to remove for thorough and complete cleaning of the air chamber. Finally, the hot table can be furnished to a restaurant or other user complete and ready for operation, since the setting of it into operation merely calls for plugging it into the usual lighting circuit.

What I claim as new and desire to obtain Letters Patent for is:

1. In a hot food table, in combination, means for presenting a plurality of members to be heated in substantially horizontally disposed relation, means for confining a substantial volume of air in contact with said presenting means, unitary means for electrically and continuously heating a substantial portion of said air, and means for substantially horizontally propagating and recirculating said heated air from a border of said confining means past said presenting means whereby rapid and continuous heating of the members presented by said presenting means is accomplished.

2. In hot food table construction, in combination, means for presenting a plurality of members to be heated, means for confining a substantial volume of air beneath said elements, means for electrically heating and substantially horizontally propagating a substantial portion of said air in continuous circulation from a border of said confining means past said inserts and back again, and means responsive to the temperature of said volume of air for automatically controlling the operation of said heating means.

3. In hot food table construction, an air chamber comprising a horizontally elongated hollow housing, a table-type top for said housing formed to receive a plurality of food inserts therein, and means mounted in conjunction with a vertical wall of said housing to heat the inserts within said housing by substantially horizontally propagated air currents, said heating means comprising path forming means to take in air at one level and expel it at another, said path forming means including high velocity circulating means and high capacity heating means whereby a substantial portion of the air within said housing is continually heated and recirculated across underneath said inserts and back again.

BEN J. FREED.

REFERENCES CITED

The following references are of record in the file of this patent:

UNITED STATES PATENTS

| Number | Name | Date |
|---|---|---|
| 1,893,694 | Bohmker | Jan. 10, 1933 |
| 1,934,446 | Randolph | Nov. 7, 1933 |
| 2,187,196 | Douglass | Jan. 16, 1940 |
| 2,259,519 | Ershler | Oct. 21, 1941 |